United States Patent
Hussain et al.

(10) Patent No.: US 7,275,449 B2
(45) Date of Patent: Oct. 2, 2007

(54) MASS FLOW METER COMPOSED OF TWO MEASURING TUBES WITH A CONNECTING DEVICE BETWEEN THEM

(75) Inventors: Yousif Hussain, Weston Favell (GB); Chris N. Rolph, Hartwell (GB); Vincent Cook, Northants (GB)

(73) Assignee: Krohne AG, Basel (CH)

( * ) Notice: Subject to any disclaimer, the term of this patent is extended or adjusted under 35 U.S.C. 154(b) by 2 days.

(21) Appl. No.: 11/299,612

(22) Filed: Dec. 12, 2005

(65) Prior Publication Data

US 2006/0162468 A1 Jul. 27, 2006

(30) Foreign Application Priority Data

Jan. 21, 2005 (DE) ...................... 10 2005 003 161

(51) Int. Cl.
*G01F 1/84* (2006.01)

(52) U.S. Cl. ................................. 73/861.357

(58) Field of Classification Search .............................. 73/861.355–861.357
See application file for complete search history.

(56) References Cited

U.S. PATENT DOCUMENTS

| | | | |
|---|---|---|---|
| 4,781,069 A | 11/1988 | Mitzner | |
| 4,823,614 A * | 4/1989 | Dahlin | 73/861.357 |
| 5,226,330 A * | 7/1993 | Lew | 73/861.357 |
| 5,301,557 A | 4/1994 | Cage et al. | |
| 5,351,561 A | 10/1994 | Wenger et al. | |
| 5,370,002 A * | 12/1994 | Normen et al. | 73/861.355 |
| 5,602,345 A | 2/1997 | Wenger et al. | |
| 6,308,580 B1 | 10/2001 | Crisfield et al. | |
| 6,415,668 B1 * | 7/2002 | Cage | 73/861.355 |
| 6,920,798 B2 | 7/2005 | Wenger et al. | |
| 2005/0072238 A1 | 4/2005 | Wenger et al. | |
| 2005/0217352 A1 | 10/2005 | Wenger et al. | |

* cited by examiner

*Primary Examiner*—Harshad Patel
(74) *Attorney, Agent, or Firm*—Cesari & McKenna, LLP

(57) ABSTRACT

A mass flowmeter employing the Coriolis principle incorporates in at least one section two measuring tubes that extend along a common plane, as well as a connecting device that connects the two measuring tubes in the section in which they extend along the common plane. The connecting device is designed and positioned in a manner whereby its flexural strength for flections in the common plane of the measuring tubes is greater than its torsional rigidity for torsional oscillations around the connecting line between the two measuring tubes. This achieves good frequency separation between the excitation oscillations generated in the common plane of the measuring tubes and the oscillations of the measuring tubes perpendicular to the former.

6 Claims, 4 Drawing Sheets

MASS FLOW METER COMPOSED OF TWO MEASURING TUBES WITH A CONNECTING DEVICE BETWEEN THEM

BACKGROUND OF THE INVENTION

This invention relates to a mass flowmeter that employs the Coriolis principle and incorporates in at least one section two measuring tubes extending in a common plane, as well as a connecting device by means of which the two measuring tubes are interconnected within the section in which they extend along the said common plane.

Accordingly, the invention relates to Coriolis mass flowmeters that feature at least two measuring tubes which, when not oscillating, extend at least within one section along a common plane, typically parallel to each other. A key aspect in Coriolis mass flowmeters having two or more measuring tubes is the provision of at least one and, where appropriate, two connecting devices as referred to above. These connecting devices determine the effective length of the measuring range since they hold the measuring tubes in position, each defining an oscillation node. Therefore, connecting devices of this type are also known as oscillation node plates.

While the actual measuring zone of the measuring tubes is located between two such oscillation node plates, the intake and, respectively, outlet ends of the measuring tubes in front and in back of the oscillation node plates connect to the pipeline system in which the Coriolis mass flowmeter is installed. These intake and outlet ends of the measuring tubes also contribute to the vibrational isolation of the Coriolis mass flowmeter from the pipeline system.

Apart from defining the effective measuring zone of the Coriolis mass flowmeter, the connecting devices also serve to separate the excitation oscillations of the measuring tubes within the common plane of the measuring tubes from the frequency of perpendicular oscillations. The larger the frequency spacing between these two types of oscillations, the less these oscillations influence each other, which ultimately results in a correspondingly reduced effect on the measuring signal. In that respect, however, Coriolis mass flowmeters with two or more measuring tubes employed in practical application are still in need of improvement since the effect on the excitation oscillations by perpendicular oscillations of the measuring tubes, and thus the interference with the measuring signal, is still too extensive.

SUMMARY OF THE INVENTION

It is, therefore, the objective of this invention to introduce a Coriolis mass flowmeter in which the effect of the perpendicular oscillations of the measuring tubes on the excitation oscillations of the measuring tubes is minimized.

For a Coriolis mass flowmeter of the type described above, this objective is achieved by designing and positioning the connecting device in a manner whereby its flexural strength relative to flection along the common plane of the measuring tubes is greater than its torsional rigidity relative to torsional oscillations around the connecting line between the two measuring tubes.

In other words, the invention provides for the flexural strength of the connecting device in terms of flections along the common plane of the measuring tubes in which the excitation oscillations generally occur to be greater than the torsional rigidity of the connecting device in terms of torsional oscillations around an axis that links the points of contact of the connecting devices with the two measuring tubes. Due to the fact that these torsional oscillations of the connecting device are stimulated when, in phase opposition, oscillations of the measuring tubes are generated perpendicular to their common plane, whereas flexural oscillations of the connecting device occur in the common plane of the measuring tubes when in that plane, the measuring tubes are stimulated into excitation oscillations, these two types of oscillations—excitation oscillations on the one hand and perpendicular oscillations on the other—are affected in different ways. This is because, while the connecting device offers lower flexural resistance to antiphase oscillations perpendicular to the common plane of the measuring tube, there is greater flexural resistance for oscillations of the measuring tubes along their common plane in which the oscillatory stimulation takes place. The overall result is a good frequency separation between the excitation oscillations and the perpendicular oscillations of the measuring tubes, which ultimately reduces any impact on the measuring signal by the mutual effect between the excitation oscillations and oscillations perpendicular to the latter.

The connecting device may essentially be configured in many different ways as long as its flexural strength relative to flections in the common plane of the measuring tubes is greater than its torsional rigidity for torsional oscillations around the connecting line between the two measuring tubes. According to a preferred embodiment of the invention, however, the connecting device is provided with two mutually opposite reinforcing plates respectively attached to the two measuring tubes. While these reinforcing plates may be arched, a preferred implementation of the invention provides for them to be of a flat design.

These reinforcing plates may be attached, directly and/or indirectly, to the measuring tubes and/or to each other. In a preferred embodiment of the invention, the two reinforcing plates are joined via a connecting plate. The latter may again be curved but is preferably flat as well.

In principle, the reinforcing plates may be oriented along different planes. In a preferred design of the invention, however, the reinforcing plates are in parallel alignment with each other and preferably in parallel alignment with the common plane of the measuring tubes.

It is possible to design the connecting device in such fashion that the reinforcing plates and the connecting plate are of the same thickness. This allows for simple production of the connecting device, for instance from a single plate, by suitably bending its peripheral areas. According to a preferred embodiment of the invention, however, the connecting plate is thicker than the reinforcing plates. The result is an even greater frequency separation between the excitation oscillations and the perpendicular oscillations of the measuring tubes. Comparatively thinner reinforcing plates substantially reduce the torsional rigidity for torsional oscillations around the connecting line between the two measuring tubes in relation to the flexural strength for flections in the common plane of the measuring tubes. It follows that a connecting device with thinner reinforcing plates offers significantly greater flexural resistance to the excitation oscillations in the common plane of the measuring tubes than to perpendicular oscillations that engender torsional oscillations of the connecting device.

The connecting device can be attached to the measuring tubes in various ways. In particular, as indicated above, the reinforcing plates may be attached to the measuring tubes directly or indirectly, for instance, via the connecting plate. In a preferred embodiment of the invention, the connecting plate is provided for each measuring tube with a borehole through which extends the measuring tube concerned. According to a preferred embodiment of the invention, the inner diameter of the borehole essentially matches the outer diameter of the measuring tube and the measuring tubes are firmly mounted in these boreholes.

The connecting device may consist of any one of a large number of materials such as various metals and synthetic materials. Similarly, there are a great many ways in which the connecting device can be attached to the measuring tubes, be it by welding, soldering or gluing etc., depending on the materials used.

There are numerous possibilities for configuring and enhancing the design of the Coriolis mass flowmeter according to this invention. In this context, attention is invited to the dependent claims and to the following detailed description of preferred embodiments of the invention with reference to the attached drawings.

DESCRIPTION OF THE PREFERRED EMBODIMENTS

Figure 1:
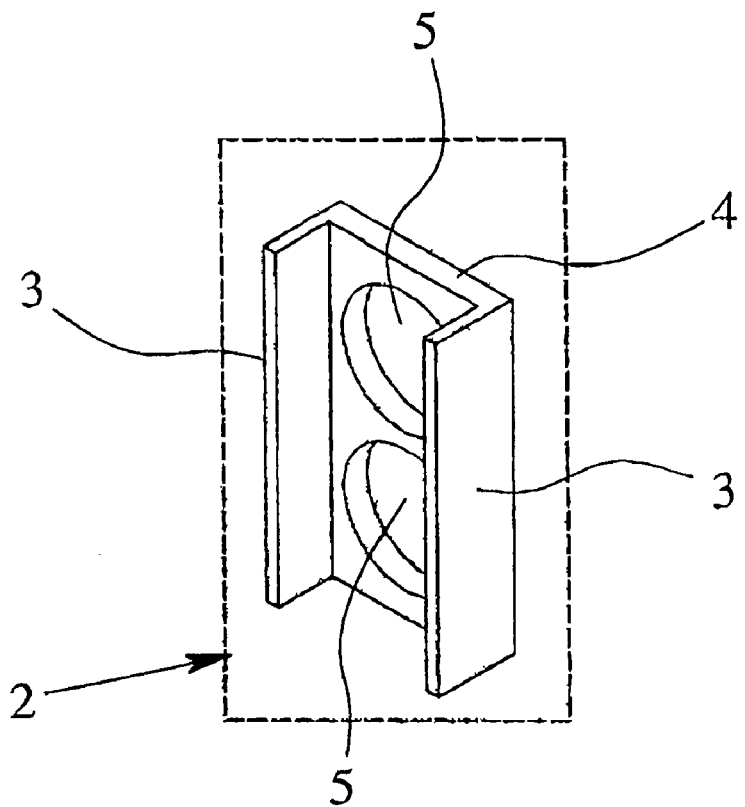
FIG. 1 is a perspective view of a connecting device for a Coriolis mass flowmeter according to a first embodiment example of the invention.
Figure 2:
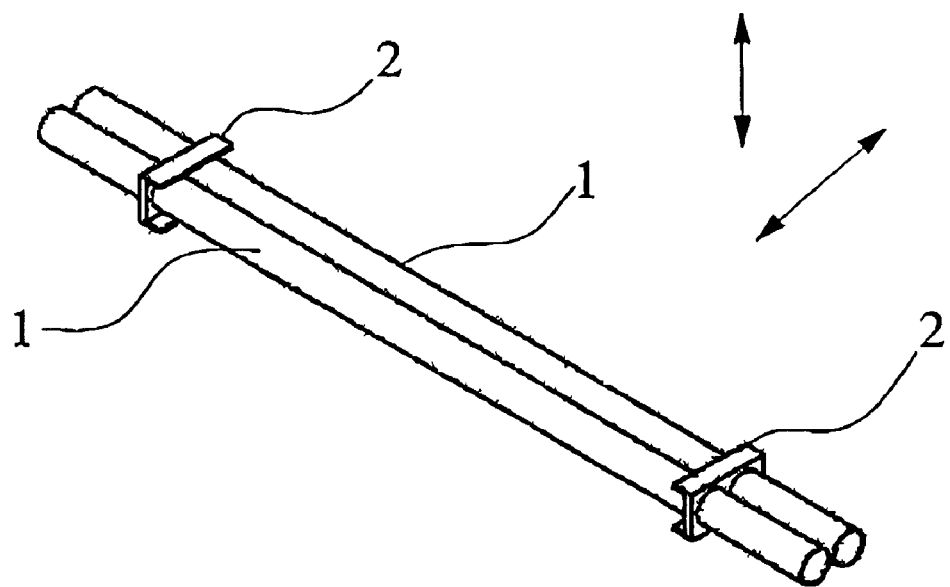
FIG. 2 is a perspective view of the measuring tubes and connecting devices in a Coriolis mass flowmeter according to the first embodiment of the invention.

FIGS. 1 and 2 show the essential, novel details of a Coriolis mass flowmeter according to a first preferred embodiment of the invention. They illustrate two mutually parallel measuring tubes 1 provided with two connecting devices 2. The connecting devices 2 have an essentially U-shaped cross-sectional profile composed of two reinforcing plates 3 that are connected with each other via a connecting plate 4 in a manner whereby these reinforcing plates 3 are aligned parallel to each other and at a right angle to the connecting plate 4. The reinforcing plates 3 are thinner than the connecting plate 4, thus creating the above-mentioned effect whereby the connecting devices 2 offer substantially less flexural resistance to torsional oscillations than to flexural oscillations along the common plane of the measuring tubes 1.

The connecting plate 4 is provided with two boreholes 5 whose inner diameter essentially matches the outer diameter of the measuring tubes 1. It is thus possible to slide the connecting devices 2 over the measuring tubes 1 and to join them with the latter. In the first preferred embodiment of the invention, the connecting devices 2 are produced from stainless steel, allowing them to be welded to the measuring tubes 1 which consist of titanium.

Figure 3:
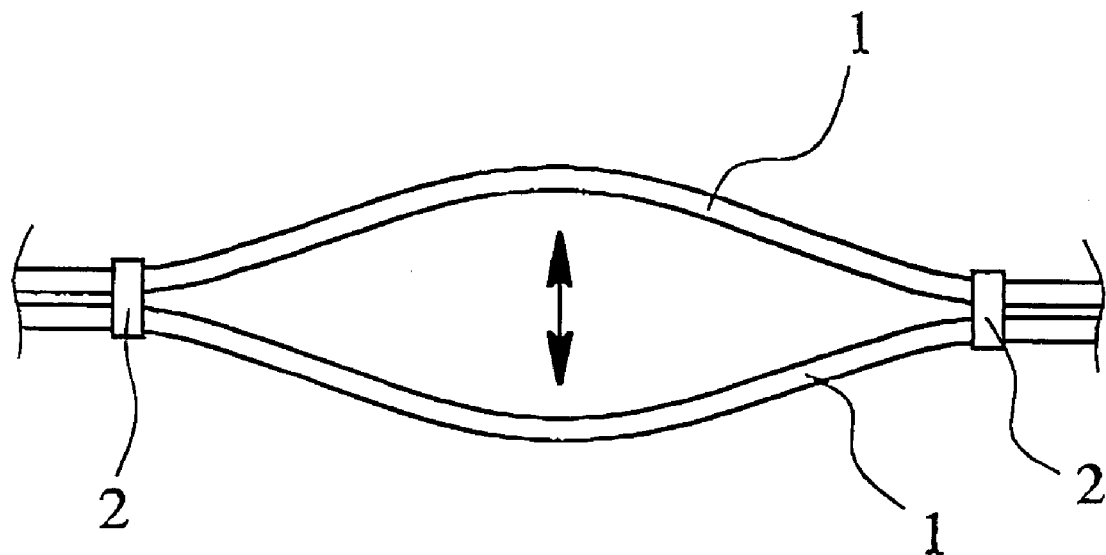
FIG. 3 is a top view illustrating the oscillatory stimulation of the measuring tubes in the Coriolis mass flowmeter according to the first preferred embodiment of the invention.
Figure 4:
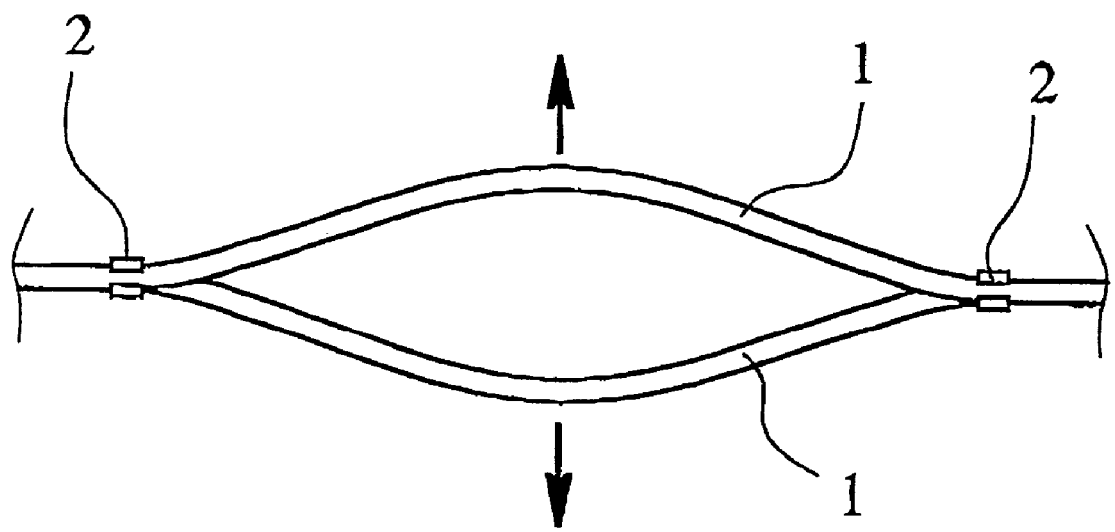
FIG. 4 is a lateral view of the oscillations generated perpendicular to the plane of the oscillatory stimulation of the measuring tubes in the Coriolis mass flowmeter according to the first preferred embodiment of the invention.

FIGS. 3 and 4 illustrate the resonance pattern of the connecting devices 2 at different oscillations. FIG. 3 is a top view of the two measuring tubes 1, joined with two connecting devices 2, in a state of maximum deflection by an excitation oscillation along the common plane of the measuring tubes 1. As can be seen, such excitation oscillations cause the oscillating measuring tubes 1 to affect the connecting devices 2 in such fashion as to result in flexural oscillations of the connecting devices 2 in the common plane of the measuring tubes 1. Concurrently, the reinforcing plates 3 on their part are caused to resonate with flexural oscillations in a corresponding plane. Such oscillations are opposed, through appropriate upsetting of the reinforcing plates 3 on one side and expansion on the opposite side, by a very high level of bending resistance.

By contrast, when the measuring tubes 1 oscillate in phase opposition perpendicular to the plane of oscillatory excitation, it is relatively easy for the connecting devices 2 to be stimulated into torsional oscillations along the connecting line between the two measuring tubes 1, as will be evident from FIG. 4. The result is a good frequency separation between the two types of oscillation, which ultimately minimizes the effect the measuring-tube oscillations perpendicular to the excitation oscillations have on the measuring signal.

Figure 5:
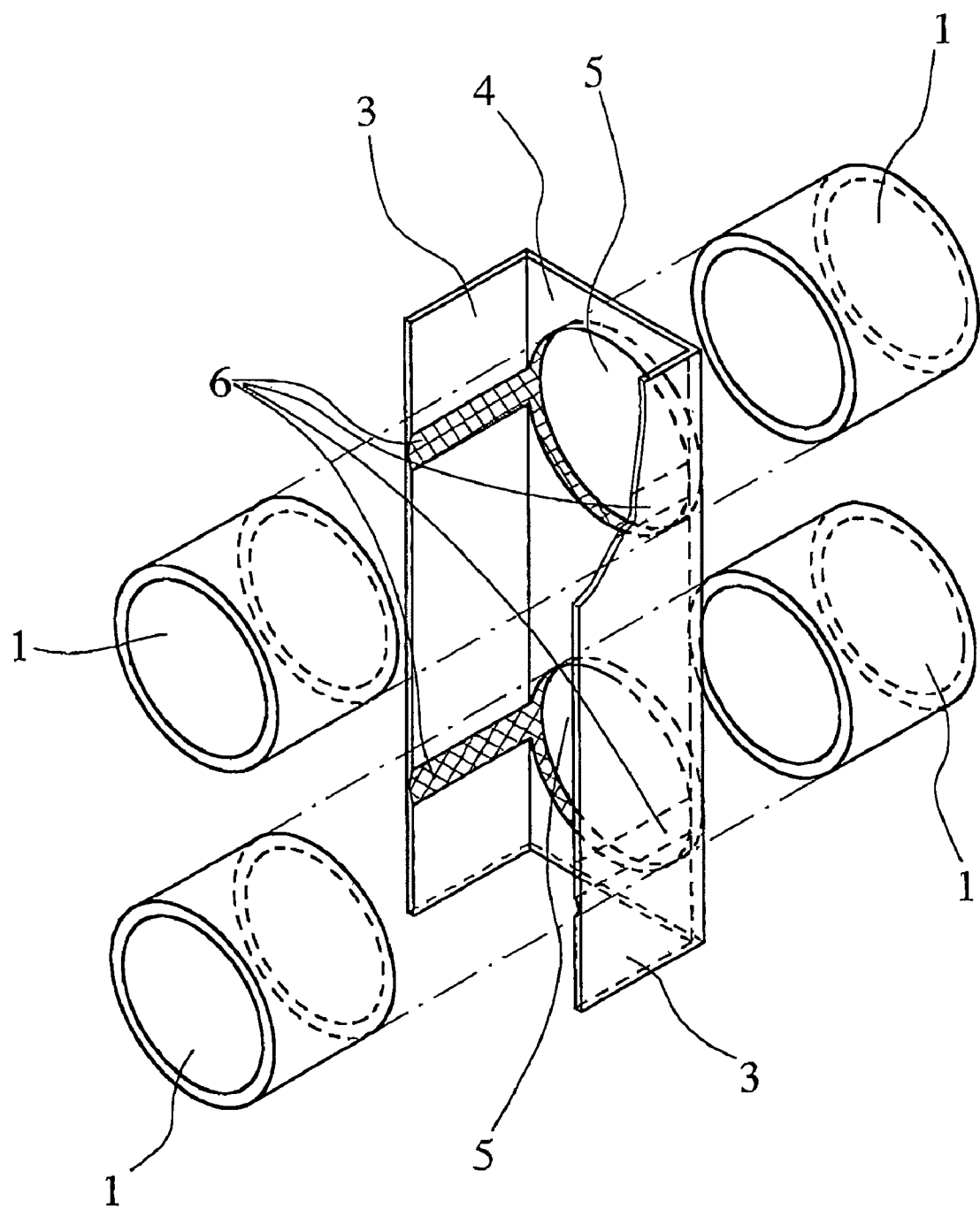
FIG. 5 is a partial view of the measuring tubes and a connecting device in a Coriolis mass flowmeter according to a second embodiment of the invention.

FIG. 5 depicts a second preferred embodiment of a Coriolis mass flowmeter according to the invention, showing only the essential details while omitting the segments of the measuring tubes 1 next to the connecting devices 2 so as to more clearly illustrate how the measuring tubes 1 are mounted in the connecting device 2. In this case, the measuring tubes 1 are not only fastened inside the boreholes 5 but also to the inner surfaces of the reinforcing plates 3. As indicated in FIG. 5, the bond between these and the measuring tubes 1 is again made by weldings 6. This type of attachment is particularly advantageous for achieving good frequency separation in the case of long measuring tubes 1 especially when these are of a small diameter. Constructed that way, the bending resistance of the connecting device 2 to flexural oscillations in the common plane of the measuring tubes 1 will be even substantially greater while barely affecting torsional rigidity.

Figure 6:
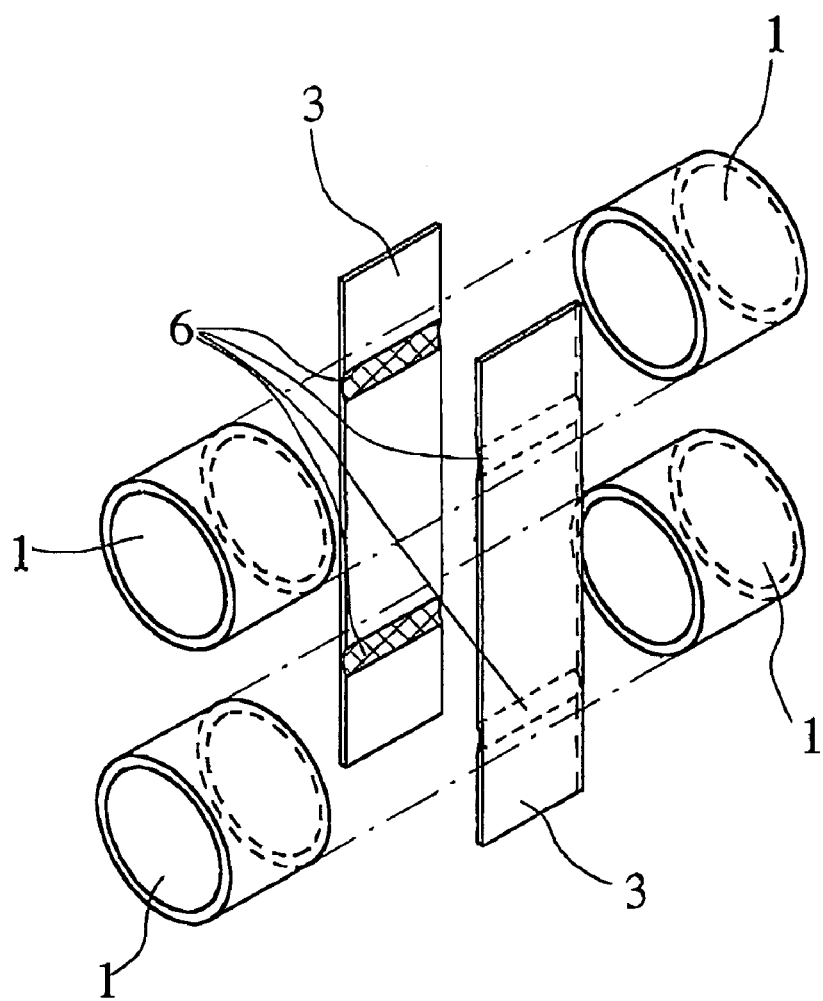
FIG. 6 is a partial view of the measuring tubes and a connecting device in a Coriolis mass flowmeter according to a third preferred embodiment of the invention.

FIG. 6 depicts a third preferred embodiment of a Coriolis mass flowmeter according to the invention, again, as in FIG. 5, showing only the essential details while omitting the segments of the measuring tubes 1 next to the connecting device 2. In this case, the connecting device 2 consists of only two reinforcing plates 3 without these being interconnected by means of a connecting plate 4. In a manner similar to that in the second preferred embodiment of a Coriolis mass flowmeter illustrated in FIG. 5, the inner surfaces of the reinforcing plates 3 are welded to the measuring tubes 1, with weldings 6 as shown in FIG. 6. One advantage of this configuration is that it is inexpensive to make and easy to install. The functional concept is essentially the same as that in the second preferred embodiment of a Coriolis mass flowmeter according to the invention as shown in FIG. 5, except that it does without the contributive effect of the connecting plate which, however, is substantially inferior to that of the reinforcing plates 3.

Figure 7:
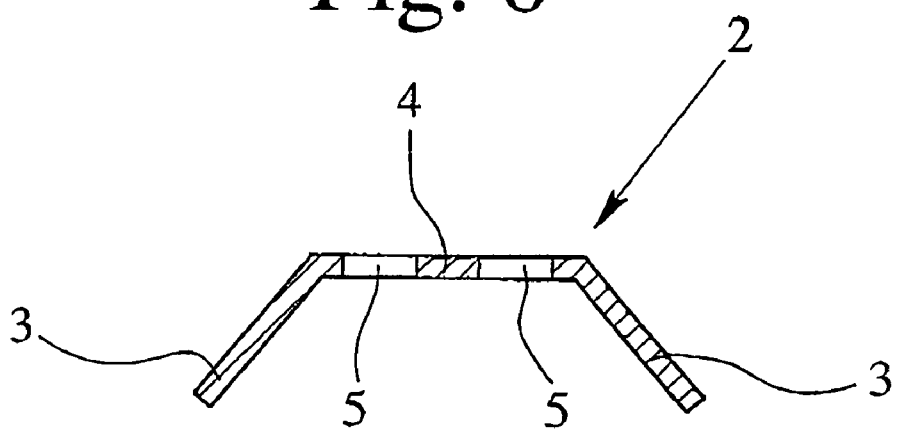
FIG. 7 is a cross-sectional view of a connecting device for a Coriolis mass flowmeter according to a fourth preferred embodiment of the invention.

Finally, FIG. 7 shows a connecting device 2 for a Coriolis mass flowmeter according to a fourth preferred embodiment of the invention. In this sectional view, the connecting device 2 again features two reinforcing plates 3 and, joining these, a connecting plate 4, said connecting plate 4 featuring boreholes 5 through which the measuring tubes 1 can be threaded, allowing the connecting device 2 to be joined with the measuring tubes 1. In this case, however, the reinforcing plates 3 do not extend parallel to each other. Nevertheless, this configuration has the same effect whereby there is greater bending resistance to flections of the connecting device 2 in the common plane of the measuring tubes 1 than to torsional oscillations around the connecting line between the two measuring tubes 1.

The invention claimed is:

1. A mass flowmeter employing the Coriolis principle and incorporating in at least one section two measuring tubes that extend along a common plane, as well as a connecting device that connects the two measuring tubes in the section in which they extend along said common plane, wherein the connecting device is designed and positioned in a manner whereby its flexural strength for flections in the common plane of the measuring tubes is greater than its torsional rigidity for torsional oscillations around the connecting line between the two measuring tubes, wherein the connecting device includes two mutually opposite reinforcing plates, respectively attached to the measuring tubes, and wherein the reinforcing plates are in parallel alignment relative to each other and in parallel alignment with the common plane of the measuring tubes.

2. The mass flowmeter as in claim 1, wherein the two reinforcing plates are joined together via a connecting plate.

3. The mass flowmeter as in claim 2, wherein the thickness of the connecting plate is greater than the thickness of the reinforcing plates.

4. The mass flowmeter as in claim 2 or 3, wherein for each measuring tube, the connecting plate is provided with a borehole through which the respective measuring tube is threaded.

5. The mass flowmeter as in claim 4, wherein the inner diameter of the boreholes essentially matches the outer diameter of the measuring tubes.

6. The mass flowmeter as in claim 5, wherein the measuring tubes are fastened in the boreholes.

* * * * *